Patented Aug. 4, 1936

2,049,674

UNITED STATES PATENT OFFICE 2,049,674

AZODYESTUFFS AND INTERMEDIATE PRODUCTS THEREFOR

Carl Taube, Leverkusen-I. G.-Werk, and Ernst Tietze, Cologne-on-the-Rhine, Germany, assignors to General Aniline Works, Inc., New York, N. Y., a corporation of Delaware No Drawing. Application January 16, 1935, Serial No. 2,116. In Germany January 26, 1934

8 Claims. (Cl. 8—6)

The present invention relates to new derivatives of cyanamide carboxylic acid and to the use of the said derivatives for the manufacture of azodyestuffs, more particularly it relates to compounds which may be represented by the probable general formula:

$$N\equiv C-N-N=N-R$$
$$\qquad\quad |$$
$$\qquad\;\; COOMe$$

wherein Me stands for a monovalent metallic radical, such as an alkali metal,

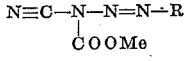

and the like, and R stands for a benzene nucleus bearing at least one substituent which does not cause solubility in water, such as alkyl, alkoxy, halogen, the nitro group, the sulfoneamide group in which the hydrogen atoms may be wholly or partially substituted, for example, by alkyl, aralkyl or aryl, further as substituents there may be present aryloxy, the trifluoromethyl group, the group $SO_2R'$, in which R' stands for alkyl, aryl or aralkyl, or a substituted amino group, such as alkylamino, arylamino and acylamino, or an azo group, or R may stand for a polynuclear aromatic radical, such as a radical of the naphthalene, anthraquinone, anthracene and carbazole series, which may bear substituents which do not cause solubility in water.

Our new compounds are obtainable by causing a water-soluble salt of cyanamide carboxylic acid, especially an alkali metal salt thereof, to react with the diazo compound of an aromatic amine of the formula: $R-NH_2$, in which R means the same as stated above, advantageously in an aqueous caustic alkaline to soda alkaline medium and at low temperature.

Our new compounds are generally well crystallizing substances, soluble in water, stable at room temperature and also at higher temperatures, say at about 90° C., and insensitive towards percussion.

A further step of the invention resides in the use of our new compounds in the manufacture of azodyestuffs in substance or on a substratum, especially the cellulosic fibre; for, due to the fact that on acidifying the new compounds, they are split up into the original diazo compounds, a metal halogenide, when hydrochloric acid is used as acidifying agent, urea and carbon-dioxide, they are valuable products for dyeing and printing purposes. This splitting up proceeds according to the following equation:

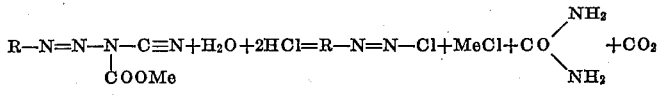

From the equation is to be seen that by acidifying the new stable compounds, there are obtainable diazo solutions ready for being used for dyeing or printing purposes, in which diazo solutions a re-formation of the condensation product from cyanamide carboxylic acid and the diazo compound by neutralization of the acid used as splitting agent cannot enter due to the chemical alteration of the cyanamide carboxylic acid.

Further our new compounds can be brought into contact with the coupling components generally used in the manufacture of ice colors in an alkaline medium without a coupling to the azodyestuff occurring. Thus, there can be prepared mixtures from our new compounds and coupling components in which mixtures the two ingredients are favorably present in about equimolecular proportions; if desired, to the dyeing preparations thus obtained wetting and/or dispersing agents may be added. These preparations are especially valuable for printing purposes; they can be worked into printing color in the usual manner and yield after printing and developing in an acid medium full and clear prints.

For developing the print it is sufficient in some cases to hang the print in the air.

The invention is illustrated by the following examples, without being limited thereto:

*Example 1.*—16.8 grams of 5-nitro-2-amino-1-methoxybenzene are transformed into the diazo compound with the aid of 6.9 grams of sodium nitrite in hydrochloric acid suspension. The filtered solution is neutralized with sodium bicarbonate and at 5° C. stirred into a solution of 18 grams of the sodium salt of cyanamide-carboxylic acid (obtainable by reacting upon disodium cyanamide with carbonic acid), in 150 grams of an aqueous sodium carbonate solution of 10% strength. The diazonium salt is quickly consumed, a brownish-yellow precipitate of the triazene being thereby formed, the precipitation of which is completed by the addition of common salt. The precipitate is filtered with suction, washed with aqueous common salt solution and dried in an air stream of 40–50° C. The condensation product having the following formula:

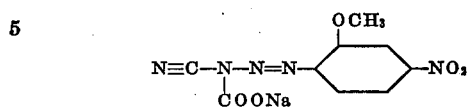

is fairly difficultly soluble in water.

*Example 2.*—15.2 grams of 5-nitro-2-amino-1-methylbenzene are diazotized in the usual manner with 6.9 grams of sodium nitrite. 15 grams of the sodium salt of cyanamide-carboxylic acid are dissolved in 500 grams of an aqueous sodium carbonate solution of 10% strength, and thereto is added the diazo solution the mineral acid of which previously has been neutralized with sodium bicarbonate. When the diazonium salt is consumed, the brownish-yellow precipitate of the triacene formed is filtered, if desired, after completing the precipitation by salting out. The triacene of the formula:

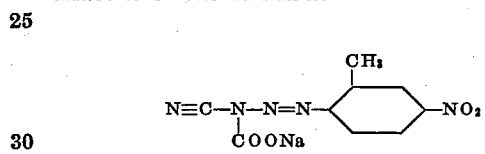

is washed with aqueous common salt solution and dried in an air stream of 40–50° C.

In an analogous manner the following diazoamino compounds have been prepared:

*Example 3.*—About equimolecular quantities of the following

| Diazoamino compounds | Coupling components |
| --- | --- |
| (a) Coupling product from diazotized 5-nitro-2-anisidine and the sodium salt of cyanamide-carboxylic acid. | 2. 3-hydroxynaphthoic acid-α-naphthylamide. |
| (b) Coupling product from diazotized 5-nitro-2-toluidine and the sodium salt of cyanamide-carboxylic acid. | 2.3 - hydroxynaphthoic acid-o-toluidide. |
| (c) Coupling product from diazotized 4-chloro-2-anisidine and the potassium salt of cyanamide-carboxylic acid. | 2.3 - hydroxynaphthoic acid-o-anisidide. |
| (d) Coupling product from diazotized 1-amino-4-benzoyl-amino-25-dimethoxybenzene and the sodium salt of cyanamide-carboxylic acid. | 2-hydroxyanthracene-3-carboxylic acid-o-toluidide. |
| (e) Coupling product from diazotized 2-aminocarbazole and the potassium salt of cyanamide-carboxylic acid. | Diacetoacetic acid-o-toluidide. | are intimately mixed together. If desired, to these mixtures there may be added stretching agents, such as Glauber's salt, and/or wetting agents, for example, 10% of the sodium salt of isobutylnaphthalene-disulfonic acid, and/or agents favoring the developing of the dyestuffs on the fibre, such as urea. These dyeing preparations can be stored for a prolonged time and are valuable for printing purposes. They can be worked into printing colors according to the usual methods and yield powerful shades of good fastness properties.

*Example 4.*—4 grams of the condensation product from diazotized 5-nitro-2-amino-1-methoxybenzene and the sodium salt of cyanamide-carboxylic acid, prepared in accordance with Example 1, and 3 grams of 2.3-hydroxy naphthoic acid-α-naphthylamide are dissolved with 3.1

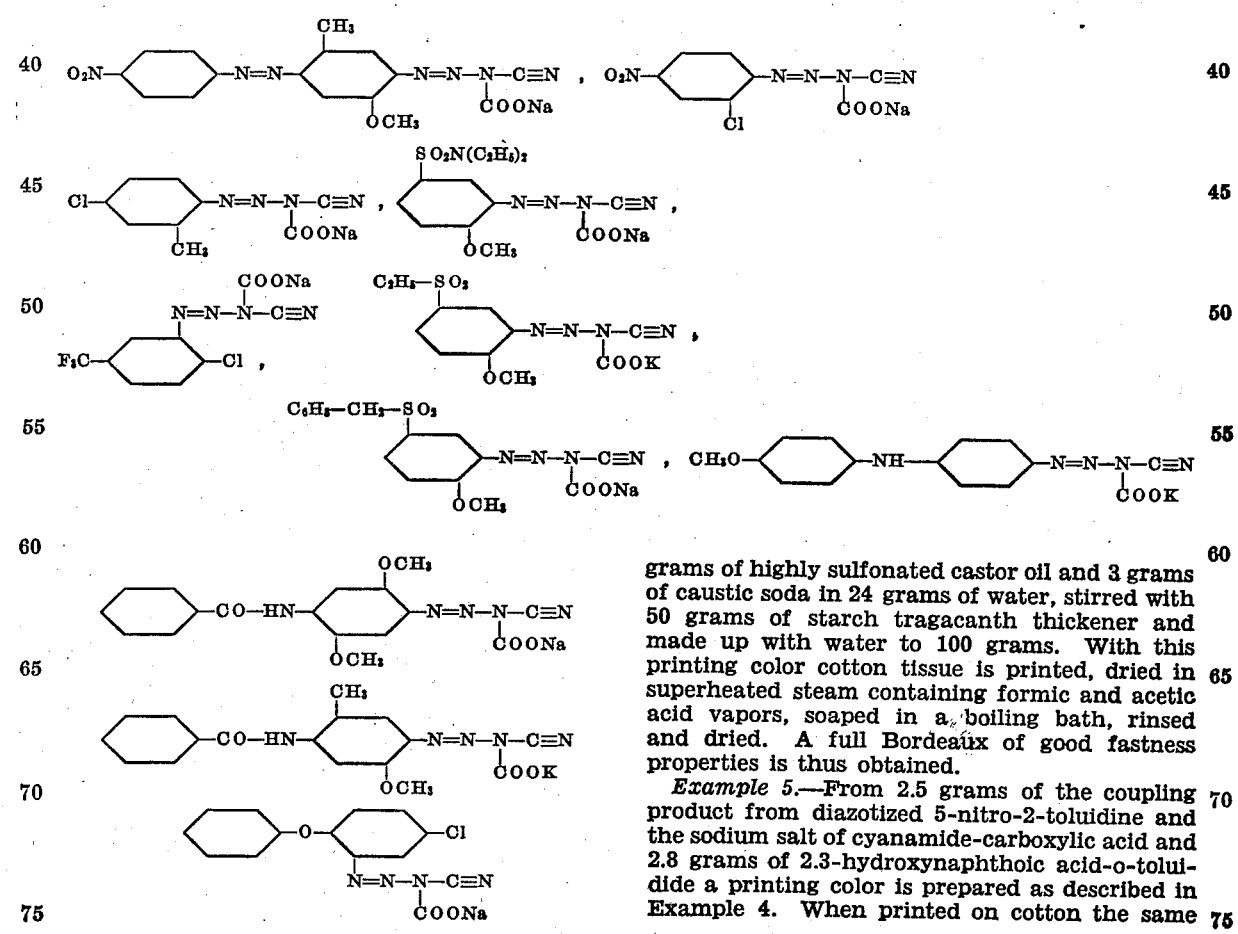

grams of highly sulfonated castor oil and 3 grams of caustic soda in 24 grams of water, stirred with 50 grams of starch tragacanth thickener and made up with water to 100 grams. With this printing color cotton tissue is printed, dried in superheated steam containing formic and acetic acid vapors, soaped in a boiling bath, rinsed and dried. A full Bordeaux of good fastness properties is thus obtained.

*Example 5.*—From 2.5 grams of the coupling product from diazotized 5-nitro-2-toluidine and the sodium salt of cyanamide-carboxylic acid and 2.8 grams of 2.3-hydroxynaphthoic acid-o-toluidide a printing color is prepared as described in Example 4. When printed on cotton the same yields after developing in an acid medium a full reddish-Bordeaux of good fastness properties.

Example 6.—From 2.5 grams of the coupling product from diazotized 4-chloro-2-anisidine and the sodium salt of cyanamide-carboxylic acid and 3 grams of 2.3-hydroxynaphthoic acid-o-anisidide a printing color is prepared as described in Example 4. When printed on cotton the same yields after developing in an acid medium a full clear red of good fastness properties.

Example 7.—From 4 grams of the coupling product from diazotized 2-nitro-4-chloroaniline and the sodium salt of cyanamide-carboxylic acid and 2.8 grams of 2.3-hydroxynaphthoic acid anilide a printing color is prepared as described in Example 4. When printed on cotton the same yields after developing in an acid medium a full yellowish-red.

In an analogous manner the condensation products from the sodium or potassium salts of cyanamide-carboxylic acid and diazotized 4-nitro-2-toluidine, or 2-nitro-4-toluidine, or 4-chloro-2-toluidine, or 2.5-dichloroaniline, or 5-benzoyl-amino-2-amino-1.4-diethoxybenzene, or 4-amino-4'-nitro-3-methoxy-6-methyl-azobenzene, or 2-aminocarbazole or 1-aminoanthraquinone yield, when worked into printing pastes with coupling components generally used in the manufacture of ice colors, after printing on cotton and developing in an acid medium, powerful clear shades of good fastness properties.

We claim:

1. Compounds of the general formula:

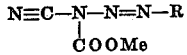

wherein Me stands for an alkali metal atom and R stands for a radical of the benzene series bearing at least one substituent selected from the group consisting of alkyl; alkoxy; halogen; the nitro group; the sulfoneamide group, in which the hydrogen atoms of the amino group may be substituted by alkyl, aralkyl or aryl; the trifluoromethyl group; the group SO₂R', in which R' stands for alkyl, aryl or aralkyl; aryloxy; a substituted amino group and the azo group, or R stands for a polynuclear aromatic amine which may bear substituents selected from the group consisting of alkyl; alkoxy; halogen; the nitro group; the sulfoneamide group, in which the hydrogen atoms of the amino group may be substituted by alkyl, aralkyl or aryl; the trifluoromethyl group; the group SO₂R', in which R' stands for alkyl, aryl or aralkyl; aryloxy; a substituted amino group and the azo group, being generally well crystallizing substances, soluble in water and being valuable substances for dyeing and printing purposes.

2. The compound of the following formula:

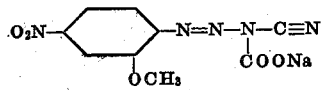

crystallizing in yellow crystals, being soluble in water and being a valuable substance for dyeing and printing purposes.

3. Preparations for dyeing and printing purposes comprising a compound of the general formula as described in claim 1, and a coupling component generally used in the manufacture of ice colors.

4. Preparations for dyeing and printing purposes comprising a compound of the general formula as described in claim 1, and a 2.3-hydroxynaphthoic acid arylamide.

5. Process which comprises applying to cellulosic fibres a compound of the general formula as described in claim 2, and a coupling component generally used in the manufacture of ice colors and developing the dyestuff by treating the cellulosic fibres in an acid medium.

6. Process which comprises applying to cellulosic fibres a compound of the general formula as described in claim 2, and a 2.3-hydroxynaphthoic acid arylamide, and developing the dyestuff by treating the cellulosic fibres in an acid medium.

7. Process which comprises applying to cellulosic fibres a compound of the general formula as described in claim 1, and a coupling component generally used in the manufacture of ice colors and developing the dyestuff by treating the cellulosic fibres in an acid medium.

8. Process which comprises applying to cellulosic fibres a compound of the general formula as described in claim 1, and a 2.3-hydroxynaphthoic acid arylamide, and developing the dyestuff by treating the cellulosic fibres in an acid medium.

CARL TAUBE.
ERNST TIETZE.